United States Patent
Jalaldeen et al.

(10) Patent No.: US 10,853,756 B2
(45) Date of Patent: Dec. 1, 2020

(54) VEHICLE IDENTIFICATION AND INTERCEPTION

(71) Applicant: INTERNATIONAL BUSINESS MACHINES CORPORATION, Armonk, NY (US)

(72) Inventors: Ahamed Jalaldeen, Bangalore (IN); Chivukula V. Narayana, Rogers, AR (US)

(73) Assignee: International Business Machines Corporation, Armonk, NY (US)

( * ) Notice: Subject to any disclaimer, the term of this patent is extended or adjusted under 35 U.S.C. 154(b) by 1093 days.

(21) Appl. No.: 15/058,663

(22) Filed: Mar. 2, 2016

(65) Prior Publication Data

US 2017/0255902 A1    Sep. 7, 2017

(51) Int. Cl.
    *G06Q 10/08*     (2012.01)
    *G08G 5/00*     (2006.01)
    *G08G 1/00*     (2006.01)
    *G08G 1/017*     (2006.01)

(52) U.S. Cl.
    CPC ......... *G06Q 10/0833* (2013.01); *G08G 1/017* (2013.01); *G08G 1/205* (2013.01); *G08G 1/207* (2013.01); *G08G 5/006* (2013.01); *G08G 5/0013* (2013.01); *G08G 5/0069* (2013.01); *G08G 5/0082* (2013.01)

(58) Field of Classification Search
    CPC ........ G08G 1/017; G08G 1/205; G08G 1/207; G08G 5/0013; G08G 5/006; G08G 5/0069; G08G 5/0082
See application file for complete search history.

(56) References Cited

U.S. PATENT DOCUMENTS

| | | | |
|---|---|---|---|
| 9,087,451 B1 | 7/2015 | Jarrell | |
| 9,275,645 B2* | 3/2016 | Hearing | G10L 25/51 |
| 9,412,278 B1* | 8/2016 | Gong | G06F 16/29 |
| 9,529,360 B1* | 12/2016 | Melamed | H04K 3/92 |
| 9,734,723 B1* | 8/2017 | Bruno | G08G 5/0056 |
| 9,816,783 B1* | 11/2017 | Means | A63F 9/0243 |
| 2003/0130770 A1* | 7/2003 | Matos | G05D 1/0022 |
| | | | 701/3 |

(Continued)

OTHER PUBLICATIONS

"US military response during the Sep. 11 attacks", published on Feb. 12, 2015 by Wikepedia.com, (Year: 2015).*

(Continued)

*Primary Examiner* — Omar Zeroual
(74) *Attorney, Agent, or Firm* — Schmeiser, Olsen & Watts; Nicholas L. Cadmus

(57) ABSTRACT

A method and system for identifying and intercepting a delivery vehicle is provided. The method includes executing a search process with respect to a plurality of delivery vehicles within a predefined geographical area and locating, within the predefined geographical area, at least one delivery vehicle of the plurality of delivery vehicles. A communication link from the delivery vehicle monitoring apparatus and the at least one delivery vehicle is established and identification data identifying the at least one delivery vehicle is retrieved. The identification data is verified with respect to a registry including identities associated with multiple delivery vehicles and it is determined if the identification data is associated with any of the identities.

6 Claims, 5 Drawing Sheets

(56) References Cited

U.S. PATENT DOCUMENTS

| | | | |
|---|---|---|---|
| 2006/0032978 A1* | 2/2006 | Matos | B64D 45/0031 244/118.5 |
| 2007/0235584 A1* | 10/2007 | Corman | H04L 67/125 244/75.1 |
| 2007/0288127 A1* | 12/2007 | Haq | B60R 25/10 701/2 |
| 2008/0255711 A1* | 10/2008 | Matos | G08G 5/0026 701/2 |
| 2008/0285628 A1* | 11/2008 | Gizis | A63H 30/04 375/135 |
| 2009/0086792 A1* | 4/2009 | Nishizawa | H04B 1/715 375/135 |
| 2009/0157233 A1* | 6/2009 | Kokkeby | G01S 3/7864 701/3 |
| 2009/0219393 A1* | 9/2009 | Vian | G07C 5/008 348/144 |
| 2010/0042269 A1* | 2/2010 | Kokkeby | G01S 3/7864 701/3 |
| 2010/0087980 A1* | 4/2010 | Spura | G05D 1/0022 701/24 |
| 2010/0222939 A1* | 9/2010 | Namburu | G07C 9/28 701/2 |
| 2012/0022719 A1* | 1/2012 | Matos | G08G 5/0013 701/2 |
| 2012/0158280 A1* | 6/2012 | Ravenscroft | G08G 5/0034 701/400 |
| 2012/0221175 A1* | 8/2012 | Spinelli | G01S 19/13 701/2 |
| 2012/0299751 A1* | 11/2012 | Verna | H04B 7/18504 340/945 |
| 2014/0018976 A1 | 1/2014 | Goossen et al. | |
| 2014/0222248 A1 | 8/2014 | Levien et al. | |
| 2014/0316616 A1* | 10/2014 | Kugelmass | G06T 11/206 701/8 |
| 2015/0054639 A1* | 2/2015 | Rosen | H04M 3/2281 340/439 |
| 2015/0254988 A1* | 9/2015 | Wang | B64D 47/08 701/3 |
| 2015/0325064 A1* | 11/2015 | Downey | G07C 5/0808 701/29.3 |
| 2016/0116917 A1* | 4/2016 | Bataillon | G05D 1/0005 701/16 |
| 2016/0140851 A1* | 5/2016 | Levy | G08G 5/045 701/3 |
| 2016/0176538 A1* | 6/2016 | Bekanich | G07C 5/008 701/14 |
| 2016/0203723 A1* | 7/2016 | Kube | G08G 5/0026 701/3 |
| 2016/0225264 A1* | 8/2016 | Taveira | G08G 5/0013 |
| 2016/0240087 A1* | 8/2016 | Kube | G05D 1/0022 |
| 2016/0244161 A1* | 8/2016 | McClure | G05D 1/0022 |
| 2016/0245907 A1* | 8/2016 | Parker | G01S 7/38 |
| 2016/0253907 A1* | 9/2016 | Taveira | G05D 1/106 701/3 |
| 2016/0274578 A1* | 9/2016 | Arwine | G06F 21/6209 |
| 2016/0291589 A1* | 10/2016 | Ashoori | G01S 1/08 |
| 2016/0292872 A1* | 10/2016 | Hammond | G01S 17/933 |
| 2016/0313734 A1* | 10/2016 | Enke | G05D 1/0044 |
| 2016/0327945 A1* | 11/2016 | Davidson | G01S 19/071 |
| 2016/0327956 A1* | 11/2016 | Zhang | G05D 1/005 |
| 2016/0371987 A1* | 12/2016 | Kotecha | G08G 5/0069 |
| 2016/0376031 A1* | 12/2016 | Michalski | G08G 5/0026 701/15 |
| 2017/0003689 A1* | 1/2017 | Lee | G05D 1/0022 |
| 2017/0004662 A1* | 1/2017 | Gong | G05D 1/0055 |
| 2017/0011333 A1* | 1/2017 | Greiner | B64D 1/02 |
| 2017/0039413 A1* | 2/2017 | Nadler | H04N 5/2258 |
| 2017/0045884 A1* | 2/2017 | Kablaoui | H04L 67/10 |
| 2017/0053537 A1* | 2/2017 | Manley | G08G 5/0069 |
| 2017/0057634 A1* | 3/2017 | Hunt | G08G 5/0082 |
| 2017/0076610 A1* | 3/2017 | Liu | H04W 4/021 |
| 2017/0092138 A1* | 3/2017 | Trundle | G08B 25/14 |
| 2017/0124789 A1* | 5/2017 | Rephlo | G06Q 10/083 |
| 2017/0127652 A1* | 5/2017 | Shen | B64D 47/08 |
| 2017/0148332 A1* | 5/2017 | Ziemba | G08G 5/0069 |
| 2017/0154536 A1* | 6/2017 | Kreiner | G06Q 10/00 |
| 2017/0192418 A1* | 7/2017 | Bethke | G08G 5/0013 |
| 2017/0233097 A1* | 8/2017 | Chang | G08G 5/0021 701/3 |
| 2017/0234724 A1* | 8/2017 | Naguib | G01H 3/08 367/117 |
| 2017/0269587 A1* | 9/2017 | Hong | G06F 3/0362 |
| 2018/0040249 A1* | 2/2018 | Kuhara | G08G 5/006 |
| 2018/0046180 A1* | 2/2018 | Falk | G08C 17/02 |
| 2018/0047295 A1* | 2/2018 | Ricci | G05D 1/0027 |
| 2018/0068567 A1* | 3/2018 | Gong | G08G 5/0034 |
| 2018/0081355 A1* | 3/2018 | Magy | H04L 67/12 |
| 2018/0157255 A1* | 6/2018 | Halverson | B64C 39/024 |
| 2018/0218619 A1* | 8/2018 | Brown | H04W 12/0602 |
| 2018/0268719 A1* | 9/2018 | Guan | G08G 5/0056 |
| 2018/0276998 A1* | 9/2018 | Yu | G06F 16/29 |
| 2018/0362158 A1* | 12/2018 | Zhang | B64C 39/024 |
| 2019/0020404 A1* | 1/2019 | Russell | H04B 7/18506 |
| 2019/0114925 A1* | 4/2019 | Schulman | G06F 21/31 |
| 2019/0197907 A1* | 6/2019 | Beard | G08G 5/0021 |
| 2020/0105152 A1* | 4/2020 | Kube | G08G 5/045 |

OTHER PUBLICATIONS

Dinakar Peri, "Exapnding Anti-UAVs Market to Counter Drone Technology", published by Claws Journal in 2015, all pages (Year: 2015).*

Samuel Kim, "Flight Testing a UAV in Simulated Controlled Airspace", published by AIAA Guidance, Navigation and Control Conference in 2013 (Year: 2013).*

Barrett, David; Burglars use drone helicopters to target homes; URL: tyyp://www.telegraph.co.uk/news/uknews/crime/116133568/Burglars-use . . . ; Retrieved from the Internet on Oct. 13, 2015; May 18, 2015; 2 pages.

Lynch, Gerald; Mysterious Drone Flights Over Paris Spark Security Concerns; Gizmodo UK; Feb. 24, 2015; URL: http:/www.gizmodo.co.uk/20215/02/mysterious-drone-flights-over-paris . . . ; Retrieved from the Internet on Oct. 13, 2015; 2 pages.

Drones spotted over seven French nuclear sites, says EDF; The Guardian; Oct. 30, 2014; URL: http://www.theguardian.com/environment/2014/oct/30/drones-spotted-ov . . . ; Retrieved from the Internet on Oct. 13, 2015; 1 page.

Drones factsheet; Reaching Critical Will; URL: http://reachingcriticalwill.org/resources/fact-sheets/critical-issues/. . . ; Retrieved from the Internet on Oct. 13, 2015; 3 pages.

Merrill, Jamie; House of Lords inquiry calls for app to track suspicious drones; Independent; URL: http://www.independent.co.uk/life-style/gadgets-and-tech/news/house-of-lords-inquiry-calls-for-app-to-track-suspicious-drones-10086125.html; Retrieved from the Internet on Oct. 13, 2015; 3 pages.

University of Birmingham Research; The Security Impact of Drones; University of Birmingham Policy Commission; URL: http://www.birmingham.ac.uk/research/impact/policy-commissions/remo . . . ; Retrieved from the Internet on Oct. 13, 2015; 3 pages.

Domestic Drone Surveillance Usage: Threats and Opportunities for Regulation; Privacy SOS; URL: https://privacysos.org/domestic_drones; Retrieved from the Internet on Oct. 13, 2015; 8 pages.

McNeal, Gregory S.; Leaked FAA Document Provides Glimpse Into Drone Regulations; Forbes; Feb. 14, 2015; URL: http://www.forbes.com/sites/gregorymcneal/2015/02/14/the-faa-may-get . . . ; Retrieved from the Internet Oct. 13, 2015; 7 pages.

Ackerman, Evan; Rapere: An Intercept Drone to Seek and Destroy Other Drones; IEEE Spectrum; Jan. 14, 2015; URL: http://sepectru.ieee.org/automaton/robotics/aerial-robots/sapere-intercept . . . ; Retrieved from the Internet on Oct. 13, 2015; 2 pages.

Finley, Klint; Crash-Avoidance System for Drones Aims to Keep Crowded Skies Safe; Wired.com; Oct. 29, 2014; URL: http://www.wired.com/2014/10/skyspecs; Retrieved from the Internet on Oct. 13, 2015; 5 pages.

To Fly a Drone in NAS Must Have Collision Detection Technology Onboard; SmartDrone; URL: http://www.smartdrone.com/to-fly-a-drone-in-nas-must-have-collision-de . . . ; Retrieved from the Internet on Oct. 13, 2015; 5 pages.

(56) References Cited

OTHER PUBLICATIONS

Nima K; Vision Based Collision Detection System; DIY Drones; Sep. 12, 2010; URL: http://diydrones.com/profiles/blogs/vision-based-collision; Retrieved from the Internet on Oct. 13, 2015; 6 pages.

Chaudhry, Sarmad; Basic Sonar-based Collision Avoidance for a Quadcopter; DIY Drones; Jun. 25, 2014; URL: http://diydrones.com/profiles/blogs/basic-sonar-based-collision-avoidanc . . . ; Retrieved from the Internet on Oct. 13, 2015; 7 pages.

Ultrasonic Collision Detection EZ-Builder Manual; EZ-Robot; URL: https://www.ez-robot.com/Tutorials/Help.aspx?id=52; Retrieved from the Internet on Oct. 13, 2015; 2 pages.

Marshall, Patrick; The tech that will make drones safe for civilian skies; GCN; Jul. 12, 2013; URL: https://gcn.com/articles/2013/07/12/drone-uav-sense-and-avoid-technologies-civilian-airs . . . ; Retrieved from the Internet on Oct. 13, 2015; 3 pages.

Brewster, Signe; Obstacle avoidance is the next big step for drones; Gigaom; Jan. 9, 2015; URL: https://gigaom.com/2015/01/09/obstacle-avoidance-is-the-next-big-step-for-drones/; Retrieved from the Internet on Oct. 13, 2015; 4 pages.

\* cited by examiner

VEHICLE IDENTIFICATION AND INTERCEPTION

FIELD

The present invention relates generally to a method for identifying a vehicle and in particular to a method and associated system for intercepting an unauthorized vehicle.

BACKGROUND

Determining travel permission or restrictions with respect to deliveries typically includes an inaccurate process with little flexibility. Preventing an apparatus from traveling a specified route based on determined travel permission may include a complicated process that may be time consuming and require a large amount of resources. Accordingly, there exists a need in the art to overcome at least some of the deficiencies and limitations described herein above.

SUMMARY

A first aspect of the invention provides a delivery vehicle identification and intercept method comprising: executing, by a computer processor of delivery vehicle monitoring apparatus, a search process with respect to a plurality of delivery vehicles within a predefined geographical area; locating within the predefined geographical area, by the computer processor, at least one delivery vehicle of the plurality of delivery vehicles; establishing, by the computer processor, a communication link from the delivery vehicle monitoring apparatus to the at least one delivery vehicle; retrieving, by the computer processor from the at least one delivery vehicle, identification data identifying the at least one delivery vehicle; verifying, by the computer processor, the identification data with respect to a registry comprising identities associated with multiple delivery vehicles; and determining, by the computer processor based on results of the verifying, if the identification data is associated with any of the identities.

A second aspect of the invention provides a computer program product, comprising a computer readable hardware storage device storing a computer readable program code, the computer readable program code comprising an algorithm that when executed by a computer processor of a delivery vehicle monitoring apparatus implements a delivery vehicle identification and intercept method, the method comprising: executing, by the computer processor, a search process with respect to a plurality of delivery vehicles within a predefined geographical area; locating within the predefined geographical area, by the computer processor, at least one delivery vehicle of the plurality of delivery vehicles; establishing, by the computer processor, a communication link from the delivery vehicle monitoring apparatus to the at least one delivery vehicle; retrieving, by the computer processor from the at least one delivery vehicle, identification data identifying the at least one delivery vehicle; verifying, by the computer processor, the identification data with respect to a registry comprising identities associated with multiple delivery vehicles; and determining, by the computer processor based on results of the verifying, if the identification data is associated with any of the identities.

A third aspect of the invention provides a A delivery vehicle monitoring apparatus comprising a computer processor coupled to a computer-readable memory unit, the memory unit comprising instructions that when executed by the computer processor executes a delivery vehicle identification and intercept method comprising: executing, by the computer processor, a search process with respect to a plurality of delivery vehicles within a predefined geographical area; locating within the predefined geographical area, by the computer processor, at least one delivery vehicle of the plurality of delivery vehicles; establishing, by the computer processor, a communication link from the delivery vehicle monitoring apparatus to the at least one delivery vehicle; retrieving, by the computer processor from the at least one delivery vehicle, identification data identifying the at least one delivery vehicle; verifying, by the computer processor, the identification data with respect to a registry comprising identities associated with multiple delivery vehicles; and determining, by the computer processor based on results of the verifying, if the identification data is associated with any of the identities.

The present invention advantageously provides a simple method and associated system capable of determining travel permission.

DETAILED DESCRIPTION

Figure 1:
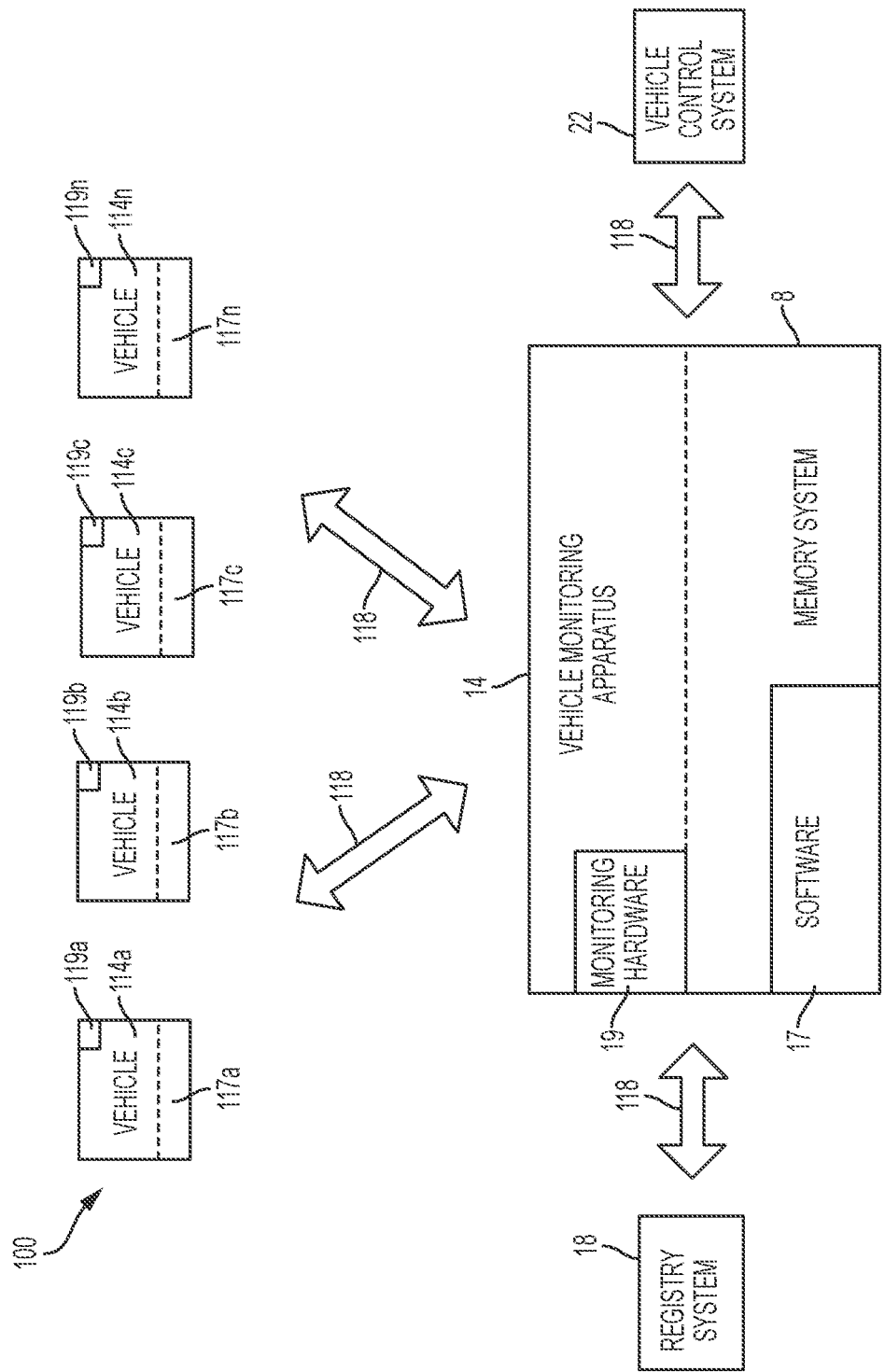
FIG. 1 illustrates a system for identifying and intercepting an unauthorized vehicle, in accordance with embodiments of the present invention.

FIG. 1 illustrates a system 100 for identifying and intercepting an unauthorized vehicle, in accordance with embodiments of the present invention. System 100 enables a process for identifying and intercepting unauthorized vehicles (e.g., any of vehicles 114a ... 114n optionally carrying packages 117a ... 117n) through a wireless communications means (or link) 118 via a vehicle monitoring apparatus 14. System 100 enables a registry system 18 for vehicle registration. System 100 automatically verifies identities of the unauthorized vehicles via data communication with vehicle operators via registry system 18, a vehicle control system 22, and vehicle monitoring apparatus 14 to initiate an interception process with respect to any unauthorized vehicles.

System 100 of FIG. 1 includes vehicle monitoring apparatus 14 in communication with vehicles 114a ... 114n, registry system 18, and vehicle control system 22 via a wireless network. Vehicles 114a ... 114n (i.e., control hardware 119a ... 119n internal to vehicles 114a ... 114n), vehicle monitoring apparatus 14, registry system 18, and vehicle control system 22 each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, vehicles 114a . . . 114n (i.e., control hardware 119a . . . 119n internal to vehicle 114a . . . 114n), registry system 18, vehicle monitoring apparatus 14, and vehicle control system 22 may each comprise a specialized hardware device comprising specialized (non-generic) hardware and circuitry (i.e., specialized discrete non-generic analog, digital, and logic based circuitry) for executing a process described with respect to FIG. 1. The specialized discrete non-generic analog, digital, and logic based circuitry may include proprietary specially designed components (e.g., a specialized integrated circuit designed for only implementing an automated process for identifying and intercepting an unauthorized vehicle). Vehicle monitoring apparatus 14 include a memory system 8, software 17, and monitoring hardware 19 (all sensors and associated control hardware for enabling software 17 to execute a process for identifying and intercepting an unauthorized vehicle). Sensors may include, inter alfa, GPS sensors, temperature sensors, pressure sensors, infrared sensors, motion sensors, etc.). The memory system 8 may include a single memory system. Alternatively, the memory system may include a plurality of memory systems. Vehicles 114a . . . 114n may retrieve/generate GPS coordinates based data (from a GPS system) in response to package delivery instructions. Each of vehicles 114a . . . 114n may comprise any vehicle that does not require a human operator to be located within the vehicles 114a . . . 114n such as, inter alfa, a remote controlled vehicle (e.g., an aircraft flown by a pilot at a ground control station), an autonomously controlled vehicle (e.g., an aircraft controlled based on pre-programmed flight plans and may include an intelligence algorithm that would enable vehicles 114a . . . 114n to know it's location and self-determine a route deliver a package to a location dynamically), a pre-programmed vehicle, etc. Alternatively, vehicles 114a . . . 114n may comprise any type of vehicle that includes a human operator located within the vehicle (e.g., an aircraft, an automobile, a boat or ship, a train, etc.). Vehicles 114a . . . 114n may include, inter alfa, an aerial vehicle, a land based vehicle, a marine (water) based vehicle, etc.

System 100 of FIG. 1 enables a process for:
1. Storing and accessing vehicle identification data and travel specific information.
2. Automatically identifying vehicles 114a . . . 114n.
3. Automatically intercepting vehicles 114a . . . 114n.

Figure 2:
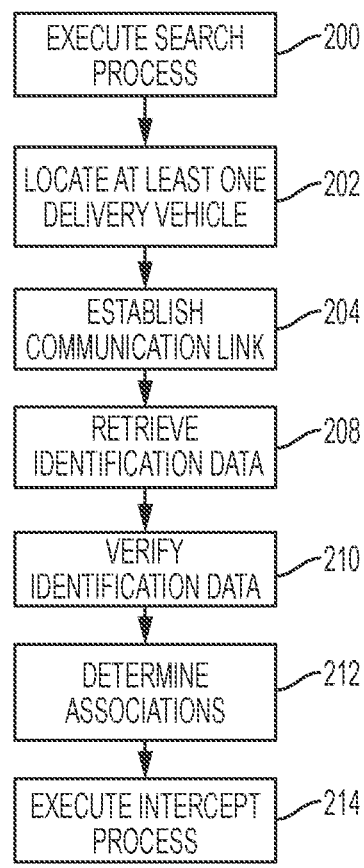
FIG. 2 illustrates an algorithm detailing a process flow enabled by the system of FIG. 1 for identifying and intercepting an unauthorized vehicle, in accordance with embodiments of the present invention.

FIG. 2 illustrates an algorithm detailing a process flow enabled by system 100 of FIG. 1 for identifying and intercepting an unauthorized vehicle, in accordance with embodiments of the present invention. Each of the steps in the algorithm of FIG. 2 may be enabled and executed in any order by a computer processor(s) or any type of specialized hardware executing computer code. In step 200, a search process is executed via a control system/hardware of a vehicle monitoring apparatus (e.g., vehicle monitoring apparatus 14 of FIG. 1). The search process is performed with respect to a plurality of delivery vehicles (e.g., delivery vehicles 114a . . . 114n of FIG. 1) within a predefined geographical area. In step 202, a delivery vehicle is located within the predefined geographical area. In step 204, a communication link from the delivery vehicle monitoring apparatus to the delivery vehicle is established. In step 208, identification data identifying the one delivery vehicle is retrieved from the delivery vehicle. In step 210, the identification data is verified with respect to a registry comprising identities associated with multiple delivery vehicles. In step 212 it is determined (based on results of step 210) if the identification data is associated with any of the identities. In step 214 (if it is determined that the identification data is not associated with any of the identities), an automated intercept process is executed with respect to the delivery vehicle. The automated intercept process may include:
1. Transmitting a communication request to a delivery vehicle control apparatus of the delivery vehicle.
2. Transmitting a notification indicating possible suspicious activity of the delivery vehicle to an authorized entity.
3. Transmitting an intercept request (from the delivery vehicle monitoring apparatus to the delivery vehicle control system) for landing (if the vehicle is in the air) the delivery vehicle with respect to specified GPS coordinates associated with a geographical location for landing.
4. Determining that the delivery vehicle has arrived at the geographical location and landing the delivery vehicle.

The process is terminated in step 214.

Figure 3:
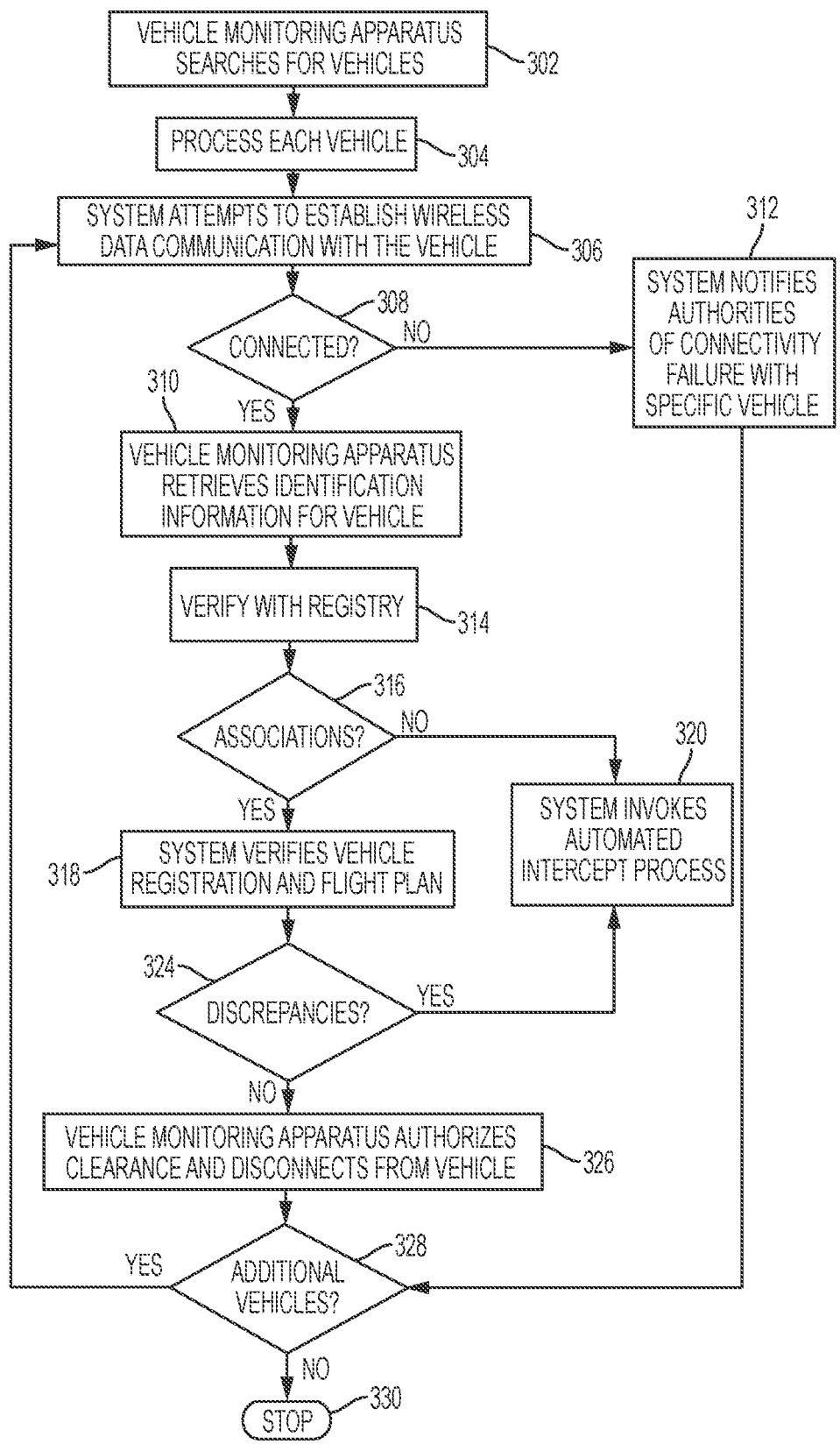
FIG. 3 illustrates a detailed algorithm further detailing the algorithm of FIG. 2 for identifying and intercepting an unauthorized air based vehicle, in accordance with embodiments of the present invention.

FIG. 3 illustrates a detailed algorithm further detailing the algorithm of FIG. 2 for identifying and intercepting an unauthorized delivery vehicle, in accordance with embodiments of the present invention. Each of the steps in the algorithm of FIG. 3 may be enabled and executed in any order by a computer processor(s) or any type of specialized hardware executing computer code. In step 302, a vehicle monitoring apparatus performs a search process with respect to delivery vehicles flying within a predefined altitude within a specified airspace. In step 304, each located vehicle is processed via the following steps:

In step 306, the vehicle monitoring apparatus attempts to establish wireless data communication with a (specific) vehicle via wireless protocols approved for communication with the vehicles. In step 308, it is determined if the vehicle is wirelessly connected to the vehicle monitoring apparatus. If in step 308, it is determined that the vehicle is not wirelessly connected to the vehicle monitoring apparatus then in step 312, the vehicle monitoring apparatus notifies authorities with respect to a connectivity failure with the vehicle. For example, the vehicle monitoring apparatus may notify law enforcement, military entities, etc. In step 328, it is determined if additional vehicles are available for processing and if the additional vehicles are available for processing then step 306 is repeated for the additional vehicles. If additional vehicles are not available then the process is terminated in step 330.

If in step 308, it is determined that the vehicle is wirelessly connected to the vehicle monitoring apparatus then in step 310, the vehicle monitoring apparatus retrieves identification information associated with the vehicle via a wireless data communication process. In step 314, the vehicle monitoring apparatus verifies the identification data with respect to a registry that includes identities of multiple differing vehicles. In step 316, it is determined if the identification data is associated with any of the identities in the registry. If in step 316, it is determined that the identification data is not associated with any of the identities in the registry then in step 320, the vehicle monitoring apparatus executes an automated vehicle intercept process instructing the vehicle to land for a physical verification by law enforcement agencies as described, infra, with respect to the algorithm of FIG. 4. If in step 316, it is determined that the identification data is associated with an identity in the registry then in step 318, the vehicle monitoring apparatus verifies vehicle registration information and a flight plan of the vehicle with respect to a specific trip specified in the registry. In step 324, the vehicle monitoring apparatus determines if any discrepancies occur in the vehicle registration information and/or the flight plan of the vehicle with respect to the specific trip as specified in the registry. If any discrepancies are located in step 324, then the automated vehicle intercept process is executed in step 320 as described, supra. If no discrepancies are located in step 324, then in step 326, the vehicle monitoring apparatus authorizes flight clearance and disconnects a wireless communication link from the vehicle. In step 328, it is determined if additional vehicles are available for processing and if the additional vehicles are available for processing then step 306 is repeated for the additional vehicles. If additional vehicles are not available then the process is terminated in step 330. The aforementioned process may be scheduled to perform a vehicle identification and interception process with respect to delivery vehicles during specified timeframes and/or may be repeated.

Figure 4:
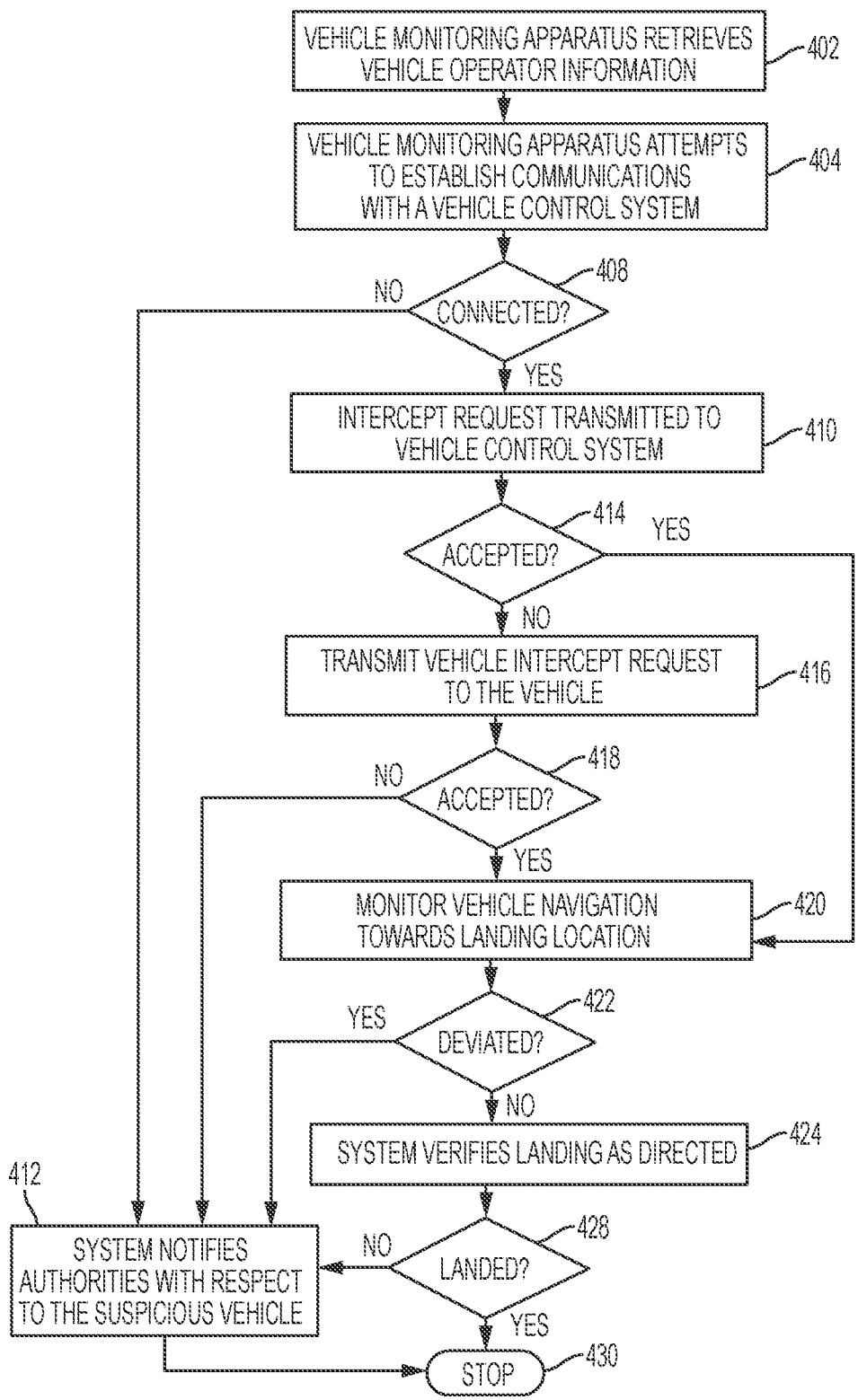
FIG. 4 illustrates an algorithm detailing the intercept step of the algorithm of FIG. 3, in accordance with embodiments of the present invention.

FIG. 4 illustrates an algorithm detailing step 320 of the algorithm of FIG. 3, in accordance with embodiments of the present invention. Each of the steps in the algorithm of FIG. 4 may be enabled and executed in any order by a computer processor(s) or any type of specialized hardware executing computer code. In step 402, the vehicle monitoring apparatus retrieves vehicle operator information from the registry that includes identities of multiple delivery vehicles. In step 404, the vehicle monitoring apparatus attempts to establish communications with a vehicle control system of the delivery vehicle. In step 408, it is determined if the communications are established. If communications are not established (i.e., a connection is not established) between the vehicle monitoring apparatus and the vehicle control system of the delivery vehicle then in step 412, authorities are notified with respect to the suspicious vehicle (in this instance the connection failure). If communications are established (i.e., a connection is established) then in step 410, a vehicle intercept request and associated GPS coordinates (comprising a location for landing the vehicle) are transmitted to the vehicle control system. In step 414, it is determined if the vehicle intercept request has been accepted by the vehicle control system. If in step 414, it is determined that the vehicle intercept request has been accepted by the vehicle control system then step 420 is executed as described, infra. If in step 414, it is determined that the vehicle intercept request has not been accepted by the vehicle control system then in step 416, the vehicle intercept request is transmitted to the vehicle. In step 418, it is determined if the vehicle intercept request has been accepted by the vehicle. If in step 418, it is determined that the vehicle intercept request has been not accepted by the vehicle then step 412 is executed (with respect to the vehicle intercept request not being accepted) as described, supra. If in step 418, it is determined that the vehicle intercept request has been accepted by the vehicle then in step 420, the vehicle monitoring apparatus monitors navigation of the vehicle towards a landing location specified in the vehicle intercept request. In step 422, it is determined if the vehicle has deviated from a path (during flight) towards the landing location specified in the vehicle intercept request. If in step 422, it is determined that the vehicle has deviated from a path towards the landing location specified in the vehicle intercept request then step 412 is executed (with respect to the deviation) as described, supra. If in step 422, it is determined that the vehicle has not deviated from a path towards the landing location specified in the vehicle intercept request in steps 424 and 428 it is determined if the vehicle has landed in accordance with the landing location specified in the vehicle intercept request. If in steps 424 and 428 it is determined that the vehicle has not landed in accordance with the landing location specified in the vehicle intercept request then step 412 is executed (with respect to the determination that the vehicle has not landed) as described, supra. If in steps 424 and 428 it is determined that the vehicle has landed in accordance with the landing location specified in the vehicle intercept request the process is terminated in step 430.

Figure 5:
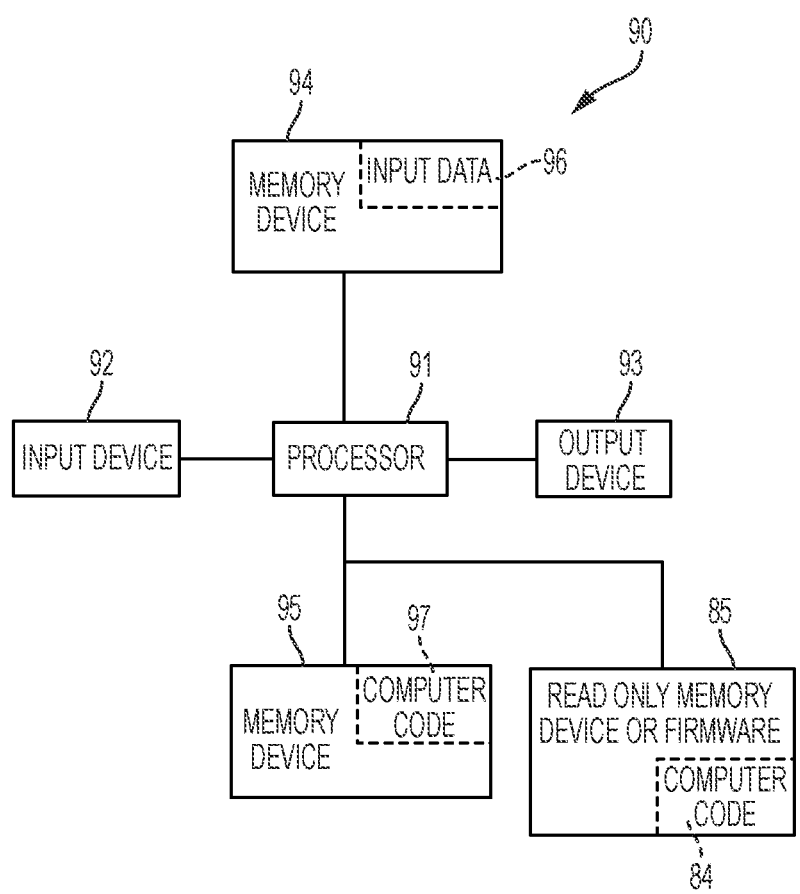
FIG. 5 illustrates a computer system used by the system of FIG. 1 for enabling a process for identifying and intercepting an unauthorized vehicle, in accordance with embodiments of the present invention.

FIG. 5 illustrates a computer system 90 (e.g., control hardware 119a . . . 119n internal to vehicles 114a . . . 114n, vehicle monitoring apparatus 14, registry system 18, vehicle control system 22, etc.) used by or comprised by system 100 of FIG. 1 for enabling a process for identifying and intercepting an unauthorized vehicle, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms for enabling a process for identifying and intercepting an unauthorized vehicle. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to identify and intercept an unauthorized vehicle. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for identifying and intercepting an unauthorized vehicle. In another embodiment, the invention provides a business method that performs the process steps of the invention on a subscription, advertising, and/or fee basis. That is, a service supplier, such as a Solution Integrator, could offer to enable a process for identifying and intercepting an unauthorized vehicle. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A delivery vehicle identification and intercept method comprising:
    executing, by a computer processor of a delivery vehicle monitoring apparatus, a search process with respect to a plurality of delivery vehicles at a predefined altitude within a predefined geographical area;
    locating within said predefined geographical area, by said computer processor, at least one delivery vehicle of said plurality of delivery vehicles;
    establishing, by said computer processor, a wireless communication link, via approved wireless protocols for vehicular communications, from said delivery vehicle monitoring apparatus to said at least one delivery vehicle;
    retrieving, by said computer processor from said at least one delivery vehicle, identification data identifying said at least one delivery vehicle;
    verifying, by said computer processor, said identification data with respect to an external registry system comprising identities associated with multiple delivery vehicles;
    determining, by said computer processor based on results of said verifying, that said identification data is not associated with at least one identity of said identities;
    detecting, by said computer processor, discrepancies located within vehicle registration information or a flight plan of said at least one delivery vehicle;
    executing, by said computer processor based on said determining or said detecting, an automated intercept process with respect to said at least one delivery vehicle, wherein said automated intercept process comprises:
        retrieving, by said computer processor from said external registry system, vehicle operator information that includes identities of said plurality of delivery vehicles;
        attempting to establish, by said computer processor, a second wireless communication link between said delivery vehicle monitoring apparatus and a control apparatus of said at least one delivery vehicle, wherein said control apparatus is separate and remote from said at least one delivery vehicle;
        in response to establishing the second wireless communication link, transmitting, by said computer processor, to said control apparatus, an intercept request for landing and physically verifying said at least one delivery vehicle, wherein said intercept request comprises instructions for landing said at least one delivery vehicle with respect to specified GPS coordinates associated with a geographical location for said landing;
        determining, by said computer processor, that the intercept request was not accepted by said control apparatus;
        in response to determining that the intercept request was not accepted by said control apparatus, transmitting, by said computer processor, the intercept request to said at least one delivery vehicle;
        determining, by said computer processor, that the intercept request was accepted by said at least one delivery vehicle;
        in response to determining that the intercept request was accepted by said at least one delivery vehicle, monitoring, by said computer processor, navigation of said at least one delivery vehicle towards said geographical location;
        detecting, by said computer processor, a deviation of said at least one delivery vehicle from a path towards said geographical location; and
        in response to the detected deviation, transmitting to an authority, by said computer processor, a notification indicating possible suspicious activity of said at least one delivery vehicle.

2. The method of claim 1, wherein said detecting, by said computer processor, discrepancies located within vehicle registration information or a flight plan of said at least one delivery vehicle comprises:
    comparing, by said computer processor based on analysis of data of said external registry system, a planned travel path of said at least one delivery vehicle with respect to a destination location of said at least one delivery vehicle with respect to a currently executed travel path of said at least one delivery vehicle with respect to said destination location.

3. The method of claim 1, further comprising: providing at least one support service for at least one of creating, integrating, hosting, maintaining, and deploying computer-readable code in said delivery vehicle monitoring apparatus, said code being executed by said computer processor to implement: said executing, said locating, said establishing, said retrieving, said verifying, and said determining that said identification data is not associated with at least one identity of said identities.

4. A computer program product comprising a computer readable hardware storage device storing a computer readable program code thereon, said computer readable program code comprising an algorithm that when executed by a computer processor of a delivery vehicle monitoring apparatus implements a delivery vehicle identification and intercept method, said method comprising:
    executing, by said computer processor of said delivery vehicle monitoring apparatus, a search process with respect to a plurality of delivery vehicles at a predefined altitude within a predefined geographical area;

locating within said predefined geographical area, by said computer processor, at least one delivery vehicle of said plurality of delivery vehicles;

establishing, by said computer processor, a wireless communication link, via approved wireless protocols for vehicular communications, from said delivery vehicle monitoring apparatus to said at least one delivery vehicle;

retrieving, by said computer processor from said at least one delivery vehicle, identification data identifying said at least one delivery vehicle;

verifying, by said computer processor, said identification data with respect to an external registry system comprising identities associated with multiple delivery vehicles;

determining, by said computer processor based on results of said verifying, that said identification data is not associated with at least one identity of said identities;

detecting, by said computer processor, discrepancies located within vehicle registration information or a flight plan of said at least one delivery vehicle;

executing, by said computer processor based on said determining or said detecting, an automated intercept process with respect to said at least one delivery vehicle, wherein said automated intercept process comprises:

retrieving, by said computer processor from said external registry system, vehicle operator information that includes identities of said plurality of delivery vehicles;

attempting to establish, by said computer processor, a second wireless communication link between said delivery vehicle monitoring apparatus and a control apparatus of said at least one delivery vehicle, wherein said control apparatus is separate and remote from said at least one delivery vehicle;

in response to establishing the second wireless communication link, transmitting, by said computer processor, to said control apparatus, an intercept request for landing and physically verifying said at least one delivery vehicle, wherein said intercept request comprises instructions for landing said at least one delivery vehicle with respect to specified GPS coordinates associated with a geographical location for said landing;

determining, by said computer processor, that the intercept request was not accepted by said control apparatus;

in response to determining that the intercept request was not accepted by said control apparatus, transmitting, by said computer processor, the intercept request to said at least one delivery vehicle;

determining, by said computer processor, that the intercept request was accepted by said at least one delivery vehicle;

in response to determining that the intercept request was accepted by said at least one delivery vehicle, monitoring, by said computer processor, navigation of said at least one delivery vehicle towards said geographical location;

detecting, by said computer processor, a deviation of said at least one delivery vehicle from a path towards said geographical location; and in response to the detected deviation, transmitting to an authority, by said computer processor, a notification indicating possible suspicious activity of said at least one delivery vehicle.

5. The computer program product of claim 4, wherein said detecting, by said computer processor, discrepancies located within vehicle registration information or a flight plan of said at least one delivery vehicle comprises:

comparing, by said computer processor based on analysis of data of said external registry system, a planned travel path of said at least one delivery vehicle with respect to a destination location of said at least one delivery vehicle with respect to a currently executed travel path of said at least one delivery vehicle with respect to said destination location.

6. A delivery vehicle monitoring apparatus comprising:

a computer processor;

a computer-readable memory unit;

said computer processor coupled to said computer-readable memory unit said computer-readable memory unit comprising instructions that when executed by said computer processor executes a delivery vehicle identification and intercept method; said method comprising:

executing, by said computer processor, a search process with respect to a plurality of delivery vehicles at a predefined altitude within a predefined geographical area;

locating within said predefined geographical area, by said computer processor, at least one delivery vehicle of said plurality of delivery vehicles;

establishing, by said computer processor, a wireless communication link, via approved wireless protocols for vehicular communications, from said delivery vehicle monitoring apparatus to said at least one delivery vehicle;

retrieving, by said computer processor from said at least one delivery vehicle, identification data identifying said at least one delivery vehicle;

verifying, by said computer processor, said identification data with respect to an external registry system comprising identities associated with multiple delivery vehicles;

determining, by said computer processor based on results of said verifying, that said identification data is not associated with at least one identity of said identities;

detecting, by said computer processor, discrepancies located within vehicle registration information or a flight plan of said at least one delivery vehicle;

executing, by said computer processor based on said determining or said detecting, an automated intercept process with respect to said at least one delivery vehicle, wherein said automated intercept process comprises:

retrieving, by said computer processor from said external registry system, vehicle operator information that includes identities of said plurality of delivery vehicles;

attempting to establish, by said computer processor, a second wireless communication link between said delivery vehicle monitoring apparatus and a control apparatus of said at least one delivery vehicle, wherein said control apparatus is separate and remote from said at least one delivery vehicle;

in response to establishing the second wireless communication link transmitting, by said computer processor, to said control apparatus, an intercept request for landing and physically verifying said at least one delivery vehicle, wherein said intercept request comprises instructions for landing said at least one delivery vehicle with respect to specified GPS coordinates associated with a geographical location for said landing;
determining, by said computer processor, that the intercept request was not accepted by said control apparatus;
in response to determining that the intercept request was not accepted by said control apparatus, transmitting, by said computer processor, the intercept request to said at least one delivery vehicle;
determining, by said computer processor, that the intercept request was accepted by said at least one delivery vehicle;
in response to determining that the intercept request was accepted by said at least one delivery vehicle, monitoring, by said computer processor, navigation of said at least one delivery vehicle towards said geographical location;
detecting, by said computer processor, a deviation of said at least one delivery vehicle from a path towards said geographical location; and
in response to the detected deviation, transmitting to an authority, by said computer processor, a notification indicating possible suspicious activity of said at least one delivery vehicle.

* * * * *